(12) United States Patent
Whitaker et al.

(10) Patent No.: US 9,550,600 B2
(45) Date of Patent: Jan. 24, 2017

(54) VESSEL AND PROCESS FOR PRODUCTION THEREOF

(75) Inventors: David Whitaker, Wiltshire (GB); Kevin Neale, Wiltshire (GB); David Squirrell, Wiltshire (GB)

(73) Assignee: ENIGMA DIAGNOSTICS LIMITED, Wiltshire (GB)

( * ) Notice: Subject to any disclaimer, the term of this patent is extended or adjusted under 35 U.S.C. 154(b) by 0 days.

(21) Appl. No.: 13/814,545

(22) PCT Filed: Aug. 2, 2011

(86) PCT No.: PCT/GB2011/051464
§ 371 (c)(1),
(2), (4) Date: Sep. 24, 2013

(87) PCT Pub. No.: WO2012/017238
PCT Pub. Date: Feb. 9, 2012

(65) Prior Publication Data
US 2014/0008376 A1  Jan. 9, 2014

Related U.S. Application Data

(60) Provisional application No. 61/371,209, filed on Aug. 6, 2010.

(30) Foreign Application Priority Data

Aug. 6, 2010 (GB) .................................. 1013267.8

(51) Int. Cl.
B65D 8/12 (2006.01)
B65D 1/40 (2006.01)
(Continued)

(52) U.S. Cl.
CPC ................. B65D 1/40 (2013.01); B01L 3/508 (2013.01); B01L 3/5082 (2013.01); B01L 3/52 (2013.01);
(Continued)

(58) Field of Classification Search
CPC ......... B65D 1/40; B29D 22/003; B01L 3/508; B01L 3/5082; B01L 3/52; B01L 2200/12; B01L 2300/0858; B01L 2300/123
(Continued)

(56) References Cited

U.S. PATENT DOCUMENTS 3,796,638 A    3/1974 Guigan
4,384,031 A *  5/1983 Kline ............................ 429/176
(Continued)

FOREIGN PATENT DOCUMENTS

DE    202010004968U U1    9/2010
GB    1 312 280             4/1973
(Continued)

OTHER PUBLICATIONS

International Search Report regarding PCT/GB2011/051464 issued Sep. 11, 2011, 2 pages.
(Continued)

*Primary Examiner* — J. Gregory Pickett
*Assistant Examiner* — Niki M Eloshway

(57) ABSTRACT

A vessel of a malleable or moldable material having one or more side walls and a closed base integral with said one or more side walls, an opening in the top of the vessel, and further comprising two or more projections extending into the interior of the vessel generally laterally from said side walls, wherein said projections are also integral with said side wall. Vessels of this type are produced by a process in which ridges are deformed into projections within a vessel blank, and this process forms a further aspect of the invention. They are particularly useful for holding solid masses such as small beads or cakes in position in the vessel.

17 Claims, 3 Drawing Sheets

Figure 1:
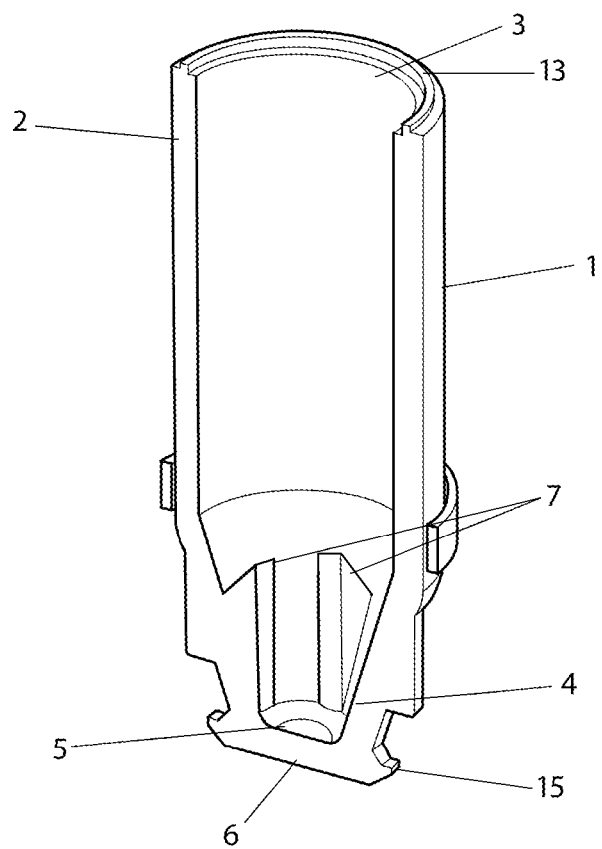

(51) Int. Cl.
  *B01L 3/00* (2006.01)
  *B29D 22/00* (2006.01)
  *B65D 1/09* (2006.01)

(52) U.S. Cl.
  CPC .......... *B29D 22/003* (2013.01); *B01L 2200/12* (2013.01); *B01L 2300/0858* (2013.01); *B01L 2300/123* (2013.01)

(58) Field of Classification Search
  USPC ................................. 220/675, 651, 669, 671
  See application file for complete search history.

(56) References Cited

U.S. PATENT DOCUMENTS

| | | | |
|---|---|---|---|
| 4,519,557 A * | 5/1985 | Newman .................. | 242/118.31 |
| 4,890,757 A * | 1/1990 | Robbins, III ................ | 220/675 |
| 4,980,293 A | 12/1990 | Jeffs | |
| 5,176,284 A * | 1/1993 | Sorensen ...................... | 220/659 |
| 5,190,151 A * | 3/1993 | Dietterich .................... | 206/214 |
| 5,578,272 A * | 11/1996 | Koch et al. .................. | 422/430 |
| 5,605,665 A * | 2/1997 | Clark et al. .................. | 422/552 |
| 5,620,853 A | 4/1997 | Smethers et al. | |
| 5,916,526 A | 6/1999 | Robbins | |
| 6,112,925 A * | 9/2000 | Nahill et al. ................. | 215/382 |
| 7,083,754 B1 | 8/2006 | Farber | |
| 7,621,424 B1 * | 11/2009 | Antonacci .................... | 220/675 |
| 8,083,092 B2 * | 12/2011 | Hartstock ..................... | 220/662 |
| 8,499,946 B2 * | 8/2013 | Giles et al. .................. | 215/11.3 |
| 8,631,963 B2 * | 1/2014 | Lane et al. ................... | 220/675 |
| 2003/0138354 A1 | 7/2003 | Fitzgerald et al. | |
| 2005/0003144 A1 | 1/2005 | Buttgen et al. | |
| 2005/0067441 A1 * | 3/2005 | Alley ........................... | 222/547 |
| 2005/0218024 A1 | 10/2005 | Lang et al. | |
| 2005/0229724 A1 | 10/2005 | OBrien et al. | |
| 2009/0117005 A1 | 5/2009 | Rousseau | |
| 2009/0127877 A1 | 5/2009 | Wright | |
| 2010/0028204 A1 * | 2/2010 | Lee et al. ..................... | 422/68.1 |
| 2010/0264140 A1 * | 10/2010 | Apps ............................ | 220/200 |

FOREIGN PATENT DOCUMENTS

| | | |
|---|---|---|
| WO | 95/26798 A1 | 10/1995 |
| WO | 98/24548 A1 | 6/1998 |
| WO | 2005/019836 A2 | 3/2005 |
| WO | 2009/019452 A1 | 2/2009 |
| WO | 2012017238 A1 | 9/2012 |

OTHER PUBLICATIONS

European Examination Report regarding European Application No. 11749886.5 issued Jul. 15, 2014, 6 pages.

* cited by examiner

VESSEL AND PROCESS FOR PRODUCTION THEREOF

The present invention relates to a vessel, in particular a vessel that is required to hold small solid masses therein, processes for the production of such vessels and methods for filling them.

Vessels adapted to retain contents therein without accidental or inadvertent loss or spillages of the contents are known. Generally however, these require the use of lids, covers, caps or seals or other restraining structures across the mouth or opening of the vessel. In some circumstances, such structures can present problems in relation to subsequent access to the vessel for the introduction of additional materials, in particular where this is required to be done automatically in an apparatus or machine. In such cases, the removal of lids, covers or caps or the piercing or removal of seals may require additional process steps as well as further components within the apparatus or machine in order to effect the necessary access to the interior of the vessel.

A particular problem arises in relation to the retention of small solid masses within vessels. For instance, in the field of chemical and biochemical reactions, increasing use is made of pre-formed reagent in the form of cakes or beads. Such cakes or beads contain some or all of the reagents necessary for carrying out a particular chemical or biochemical reaction, usually in a freeze-dried form. Cakes are generally formed by freeze-drying the reagents directly in the vessel, whereas beads are typically formed by dropping reagents into a cryogenic liquid such as liquid nitrogen to form freeze-dried beads of an appropriate size.

A particular example are the so-called "PCR-ready" beads which contain many of the components such as the polymerase enzyme, salts, buffering agents and nucleotides that are used unilaterally in the polymerase chain reaction. For assays that are conducted repeatedly, such as diagnostic assays, these beads may contain more specific components also such as particular primers or probes that are used in the amplification of particular target nucleic acids that are of for instance diagnostic significance.

Such cakes or beads are particularly small and light in weight and can be easily lost during transport or processing in open-mouthed vessels because they have a tendency to bounce when the vessel in which they are contained is subject to any movement. Even freeze-dried cakes may be moveable within the vessel since they generally shrink during the latter stages of the drying process that may separate the cakes from the side walls of the vessel. Furthermore, cakes or beads are generally of sufficiently small size to be subject to static forces which can result in adherence to for instance any covers or lids on the vessel such as laminated foils or plastic caps as these are susceptible to electrostatic charging effects. When this happens, the beads are lost on removal of the cover.

The value of the reagents contained in these beads and the possible false negative results obtained if the loss of the bead is not recognised before the reaction is commenced means this is a real problem in the field.

However, there is clearly a need to add further reagents to the beads in the vessel before they can be used and thus they are required to be employed in open or readily openable vessels. However, the manufacturing constraints placed upon such vessels means that it is generally difficult or complex to provide any sort of restraining means for the beads.

According to a first aspect of the present invention there is a provided a vessel of a malleable or mouldable material having one or more side walls and a closed base integral with said one or more side walls, an opening in the top of the vessel, and further comprising one or more projections extending into the interior of the vessel from said side walls, wherein said projections are also integral with said side wall.

The projections may or may not be resilient depending upon the nature of any solid that they are intended to contain. They may take the form of flanges, teeth or tines to suit the particular requirements. When in the "at rest" position within the vessel, the projections form a restraint that prevents solid masses located below the projections from being displaced within the vessel or exiting through the mouth of the vessel.

Thus the addition of inwardly extending projections (i.e. extending into the interior of the vessel, generally laterally from said side walls) provides a useful retaining structure within the vessel which may be used to prevent any solid masses within the vessel inadvertently exiting through the opening of the vessel or becoming associated for instance electrostatically with any cover or lid provided on the opening of the vessel.

Where the projections are resilient, the solid mass may be introduced into the vessel by applying pressure to slightly deform the projections downward to allow the solid mass to pass towards the base of the vessel. However, once this filling operation has been completed, the resilience of the projections is such that they are restored to a generally inwardly extending orientation which is sufficient to restrain the solid mass and thus prevent it from readily passing up the vessel towards the opening from where it may be lost.

However, it is possible to provide rigid projections, for instance where the vessel is intended to contain freeze-dried cakes that can be formed in situ in a base region of the vessel.

The integral nature of the base and side walls of the vessel means that it is not prone to leaks.

Suitably the one or more projections are arranged such that they project generally inwardly within the vessel. They may be horizontally arranged, or they may be inclined either upwardly or downwardly within the vessel, depending upon the manufacturing procedure discussed further below. Horizontal or downwardly inclined projections may facilitate the further deformation required to allow the filling operation to proceed when the projections are resilient in nature.

They may suitably be profiled to facilitate the trapping of small volumes of liquids, before freeze-drying, using surface tension effects. Thus for instance, when a small volume of liquid is added to the vessel for freeze-drying in the base, the projections may be profiled to ensure that when in place, the volume remains below the projections through surface tension prior to freeze-drying. For this purpose, they may suitably have a horizontal under-surface.

Suitably more than one, (i.e. two or more) for instance from 3-10 projections are provided side by side but spaced around the side walls of the vessels for example at regular intervals, to provide a mesh-like or cage-like structure that can act as an effective barrier to the egress of solid materials present on the base of the vessel. The size and spacing of the projections is suitably selected so as to prevent passage of the solid material intended for use in the vessel. Suitably, they are arranged at a similar height or level within the vessel. However, further reagents in particular fluids such as liquids or even smaller solids such as powders or particulates can pass the projections and so be placed into the vessel where they can progress downwards to the base and contact solid material retained therein.

The vessel itself may be of various cross-sectional shapes, including square, rectangular, hexagonal, octagonal or other polyhedral shapes as well as rounded cross sections such as circles or ovals.

Where the vessel is a polyhedral shape in cross-section, one or more projections may be suitably be provided on each wall. Where the vessels are of rounded cross section as found in a tubular container, the projections are suitably spaced annularly around the inner surface of the sidewall.

The projections are situated at a suitable distance away from the base to restrain the solid mass at an appropriate position within the vessel. Thus in particular the projections are spaced downwards from the opening of the vessel, and may suitably be located in the lower half of the vessel, for instance in the lower third of the vessel, depending upon the relative size of the vessel and the solid mass to be held within it.

In a particular embodiment, the vessel may comprise a lower portion of relatively small cross sectional area and/or of an tapering profile to allow the creation of the small reaction volumes used for example in some chemical or biochemical reactions, and an upper portion having a relatively expanded cross sectional area, which accommodates the opening. The expanded upper portion provides for easier addition of for instance reagents into the vessel. In such vessels, the projections may suitably be arranged at the level of the junctions of the upper and lower portions.

The dimensions of the vessels may be of any suitable size to fulfil the purpose for which they are intended.

In a particular embodiment however, the vessels are for carrying out chemical or biochemical reactions and will have an overall volume to suit this purpose. Where a freeze-dried cake is formed in situ, the vessel will have to be of sufficient size to accommodate in the region of and preferably entirely below the projections the volume of the solution prior to freeze-drying which will be greater than the volume of the cake. Furthermore, the overall vessel will have to accommodate the final volume of rehydrated reaction mixture formed from the dried or solid materials, when further reagents or solutions are added, which may be significantly greater.

For instance the reaction volume of the vessel or the portion of the vessel in which reactions are carried out may be in the range of from 5-1000 μl and preferably from 5 to 100 μl, in particular 10 to 50 μl.

The vessels may be provided with suitable external features to allow engagement or support in any desired restraint or holder. For instance, they may be provided with lips, flanges or clips to allow them to be fixed in place in apparatus or devices that allow automatic filling or sampling. A particular example of such a vessel is a REMP™ tube.

A second aspect of the invention provides a method of preparing a vessel as defined above, said method comprising (i) forming from a malleable or mouldable material, a vessel blank comprising a bottom and integral side walls and having one or more vertically arranged ridges arranged on an inner surface of said side walls, and subsequently (ii) introducing a deforming tool into said vessel blank which tool is able to deform the said one or more ridges so as to produce said one or more inwardly directed projections therefrom, and (iii) withdrawing the deforming tool from the thus formed vessel.

The method provides an easy way to prepare the integral vessels of the first aspect of the invention. Thus they can be prepared cheaply and the method may therefore be employed to produce easy to use, disposable vessels.

The malleable or mouldable material is suitably a plastics material, glass or metal such as aluminium. If necessary any metal materials may be coated to prevent interference with the reaction process, for example using a coating as described in WO2009/019452.

Where the projections are required to be resilient, they are suitably of a thermoplastic material such as polypropylene or high density polyethylene that is formed into the desired vessel blank in a mould using conventional moulding technology.

The subsequent deforming step (ii) may be carried out before the thermoplastic has fully set or the glass has solidified. During this step, the vessel blank is suitably held within an outer restraint or mould to prevent distortion of the vessel walls. Alternatively or additionally, the vessel and or the ridges are heated just prior to or during the deforming process for example using a heated deforming tool.

The deforming tool used in step (ii) is designed to contact the ridges of the vessel blank during introduction. As the deforming tool is pushed further into the vessel blank, it presses down on the ridges and deforms them in a generally inward direction so as to form the desired mesh-like or cage-like structure.

In a particular embodiment, the deforming tool will comprise a solid mass that is shaped to ensure that all ridges are deformed by a similar amount. The deforming tool may comprise an axial projection that contacts the base of the vessel blank when the ridges have been sufficiently deformed.

However, other arrangements may be envisaged, including shaping of the moulding tool to fit between ridges and thus formed projections to ensure that there is no deformation in the horizontal direction. The deforming tool may be shaped to create projections that are entirely horizontal, or they may be upwardly or downwardly inclined. The extent of deformation possible may be dependent to some extent on the material being used. Generally, a fairly low level of deformation, resulting in projections that are inclined upwards will be easy to achieve and will fulfil the desired function of preventing or inhibiting the loss of solid masses from within the vessel.

In particular embodiments, the vessel is of a plastics material that may be adapted for instance by the inclusion of carbon or other conducting particles therein, to conduct an electric current and thus act as a resistive heater, as for example described in WO98/24548 and WO2005/019836.

The vessel may be opaque to light to protect the contents from photolytic degradation. However, they may be transparent or partially transparent to allow inspection of the contents, for instance during a reaction.

Vessels of the invention may be filled as described above, for instance by adding a solution of reagents to the base of the vessel and freeze-drying these in situ, or by forcing a bead of dried reagents past projections which are, in this case resilient. These methods form a further aspect of the invention.

Figure 2:
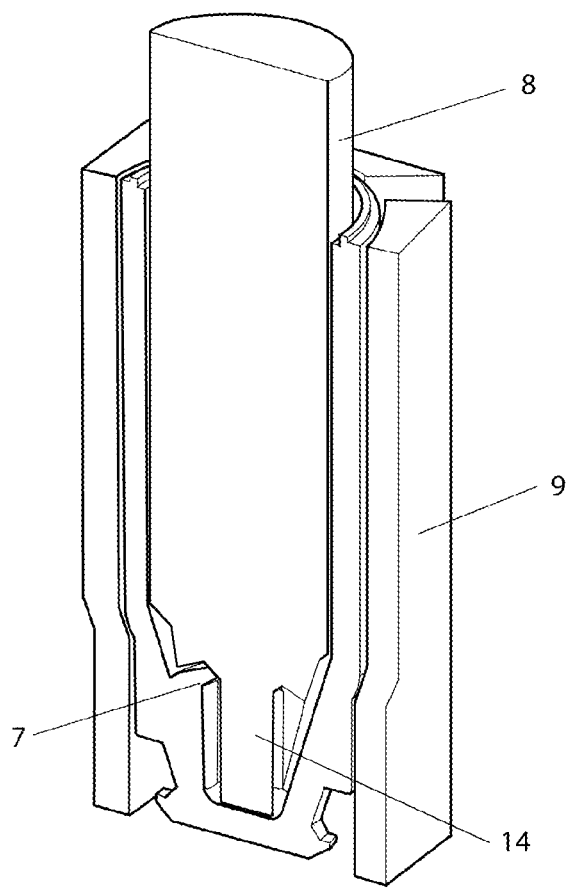
Figure 3:
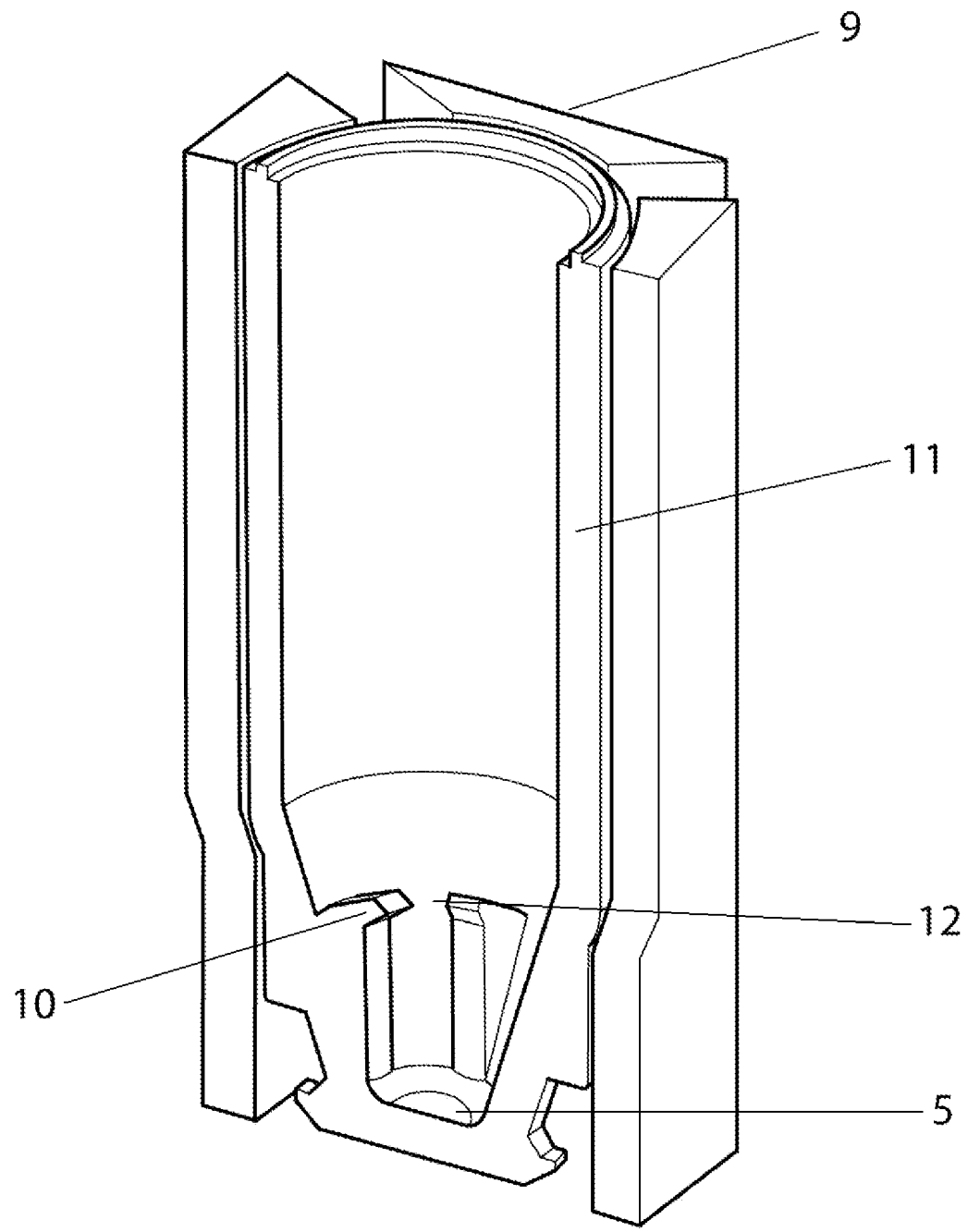

The invention will now be particularly described by way of example, with reference to the accompanying diagrammatic drawings in which FIG. 1 is a diagrammatic section through a vessel blank prepared in accordance with the second aspect of the invention;

FIG. 2 illustrates a second step in the process of the second aspect of the invention; and FIG. 3 is a diagrammatic section through a vessel of the first aspect of the invention.

In the illustrated embodiment, a vessel blank (1) (FIG. 1) of a thermoplastic material is produced using conventional moulding technique. The blank (1) is formed with a generally tubular upper section (2) of which has an opening (3) at the top. The upper surface is provided with a welding feature in the form of a ridge (13) to assist with subsequent foiling.

An inclined intermediate section (4) joins the upper section (2) with a lower reagent chamber (5) which is therefore of reduced cross-sectional area. The reagent chamber (5) is provided with an integral base (6). At the base of the vessel, an external lip (15) is provided to allow it to be fixed into a rack system, for example to assist with robotic liquid filling processes.

Arranged on the inner surface of the intermediate section (4) are a plurality of annularly arranged vertical ridges (7). An upper portion of the ridges (7) are spaced from the surface of the intermediate section (4), leaving a gap into which a deforming tool may be inserted.

Once the vessel blank (1) has been formed but whilst it is retained within an outer mould (9), a forming tool (8) is introduced therein (FIG. 2). The forming tool (8) is shaped to be able to pass down the vessel blank (1) so as to contact and apply pressure to the ridges (7). During this action, the ridges (7) are bent over and deformed, forming projections (10) which as illustrated are in the form of teeth that extend inwardly into the vessel (11) (FIG. 3). The extent of the deformation of the ridges (7) is controlled in this embodiment when a lower axial spindle portion (14) of the deforming tool (8) contacts the base (6) of the vessel blank. Once this operation is complete, the deforming tool (8) is removed from the vessel blank (1)

Where the vessel if of a thermoplastic or thermosetting material such as plastics or glass, the deforming stage of FIG. 2 is suitably carried out while the vessel blank (1) is still at an elevated temperature so that the projections (10) are deformed within the vessel (11) prior to setting or solidification. They are suitably inclined downwards towards centre of the vessel (11). In this instance, once cooled to room temperature, the vessel (11) becomes set.

Where the projections (10) are slightly resilient, they may be deformed downwards to allow the introduction of a reagent bead through the central gap (12) between the ends of the projections (10) into the reagent chamber (5). However, after this operation, they will revert to the position shown in FIG. 3 and it will not be possible for a reagent bead, whose diameter is larger than the central gap (12) to be removed from the vessel (11).

Further reagents including liquids such as solvents and buffers may be added to the reagent chamber (5) as required for processing for example by pipetting.

Where the projections (10) are not resilient, the vessel is suitably loaded by adding a reagent solution to the vessel so that it flows into the reagent chamber (5) below the projections (10). The vessel is then subjected to freeze-drying or lyophilisation conditions.

Thus the invention provides a useful addition to the range of available vessels for use in particular in chemical and biochemical reactions.

The invention claimed is:

1. A vessel for carrying out chemical or biochemical reactions, said vessel comprising: a malleable or mouldable material, the vessel having one or more side walls and a closed base integral with said one or more side walls, the one or more side walls defining an upper portion and a lower portion of relatively smaller cross sectional area having a tapering profile, the upper portion having an opening; a reagent chamber in the lower portion; two or more projections located in an area of a junction between the upper and lower portions, said two or more projections extending into an interior of the vessel, generally laterally from said one or more side walls, wherein said projections are also integral with said side wall; and a freeze dried reagent retained within a region located below the projections, the projections forming a restraint that prevents the freeze dried reagent being displaced within the vessel or exiting through the opening in the upper portion.

2. The vessel of claim 1 wherein the projections are in the form of flanges, teeth or tines.

3. The vessel of claim 1 wherein said two or more projections are arranged such that they project generally inwardly and upwardly within the vessel.

4. The vessel of claim 1 wherein the projections are spaced around said one or more side walls of the vessel at a similar level therein.

5. The vessel of claim 1 wherein the projections are resilient.

6. A method for loading the vessel of claim 5, the method comprising forcing a solid freeze dried reagent past resilient projections within the vessel.

7. The vessel of claim 1 wherein the vessel is of generally circular cross-section.

8. The vessel of claim 1 wherein the projections are spaced downwards from the opening of the vessel.

9. The vessel of claim 1 wherein the vessel comprises an upper portion having a relatively expanded cross sectional area, which accommodates the opening.

10. The vessel of claim 1 wherein the malleable or mouldable material is a plastics material.

11. The vessel of claim 10 wherein the plastics material is an electrically conducting polymeric material.

12. A method of preparing the vessel of claim 1, said method comprising: (i) forming from a malleable or mouldable material, a vessel blank comprising a bottom and integral side walls and having one or more vertically arranged ridges arranged on an inner surface of said side walls; and subsequently (ii) introducing a deforming tool into said vessel blank which tool is able to deform the top of said one or more ridges radially inwards so as to produce said one or more inwardly directed projections therefrom, (iii) withdrawing the deforming tool from the thus formed vessel, and (iv) loading the region of the vessel below the projections with the freeze dried reagent.

13. The method of claim 12 wherein the vessel blank is retained in an external mould during step (ii).

14. The method of claim 12, wherein the step of loading the region of the vessel below the projections with the freeze dried reagent is selected from (i) forcing the freeze dried reagent past resilient projections within the vessel, and (ii) adding a solution of reagents to the said region and subjecting said solution to a lyophilisation step to produce the freeze dried reagent therefrom.

15. The method of claim 12, wherein the step of loading the region of the vessel below the projections with the freeze dried reagent comprises adding a solution of reagents to said region and subjecting said solution to a lyophilisation step to produce a solidified cake therefrom.

16. The method of claim 12, wherein the inwardly directed projections comprise resilient projections and wherein the step of loading the region of the vessel below the projections with the freeze dried reagent comprises forcing a mass of solid material past said resilient projections.

17. A method for loading the vessel of claim 1, the method comprising adding a solution of reagents to said vessel so that it is accommodated below or in the region of the projections and subjecting said solution to a lyophilisation step to produce a solidified cake therefrom.

* * * * *